US007989758B2

(12) United States Patent
Köster

(10) Patent No.: US 7,989,758 B2
(45) Date of Patent: Aug. 2, 2011

(54) FRAGMENTATION OF IONS IN KINGDON ION TRAPS

(75) Inventor: Claus Köster, Lilienthal (DE)

(73) Assignee: Bruker Daltonik GmbH, Bremen (DE)

( * ) Notice: Subject to any disclaimer, the term of this patent is extended or adjusted under 35 U.S.C. 154(b) by 298 days.

(21) Appl. No.: 12/468,564

(22) Filed: May 19, 2009

(65) Prior Publication Data

US 2009/0294656 A1 Dec. 3, 2009

(30) Foreign Application Priority Data

May 20, 2008 (DE) ........................ 10 2008 024 297

(51) Int. Cl.
*H01J 49/00* (2006.01)
*B01D 59/44* (2006.01)

(52) U.S. Cl. ........................................ 250/282; 250/292

(58) Field of Classification Search .................. 250/282, 250/292

See application file for complete search history.

(56) References Cited

U.S. PATENT DOCUMENTS

| | | | |
|---|---|---|---|
| 5,886,346 | A | 3/1999 | Makarov |
| 2005/0121609 | A1 | 6/2005 | Makarov et al. |
| 2007/0023629 | A1 | 2/2007 | Makarov |

FOREIGN PATENT DOCUMENTS

| | | | |
|---|---|---|---|
| GB | 2 448 413 | A | 10/2008 |
| WO | WO 2008/063497 | A3 | 5/2008 |
| WO | WO 2009/001909 | A2 | 12/2008 |

OTHER PUBLICATIONS

Hu et al., Resonant AC Dipolar Excitation for Ion Motion Control in the Orbitrap Mass Analyzer, Aug. 10, 2005, Published 2006, Journal of Physical Chemistry A, vol. 110, No. 8, p. 2682-2689.*
Makarov, Electrostatic Axially Harmonic Orbital Trapping: A High-Performance Technique of Mass Analysis, Mar. 15, 2000, Analytical Chemistry, vol. 72, No. 6, p. 1156-1162.*

* cited by examiner

*Primary Examiner* — Jack I Berman
*Assistant Examiner* — Eliza Osenbaugh-Stewart
(74) *Attorney, Agent, or Firm* — Law Offices of Paul E. Kudirka

(57) ABSTRACT

Fragment ion spectra are acquired in Kingdon ion traps that have a potential well for harmonic oscillations of the ions in the longitudinal direction and in which the ions can oscillate radially in a plane between two or more inner electrodes. Metastable ions, preferably produced by laser desorption, are introduced into the Kingdon ion trap close to the minimum of the longitudinal potential well and stored there locally for a predetermined time period. Excess internal energy in the metastable ions causes most of the ions to decompose ergodically to fragment ions. Then the fragment ions and any remaining analyte ions are excited to execute harmonic oscillations in the longitudinal potential well. The harmonic oscillations are measured as image currents, from which a high-resolution mass spectrum of the fragment ions can be calculated.

14 Claims, 5 Drawing Sheets

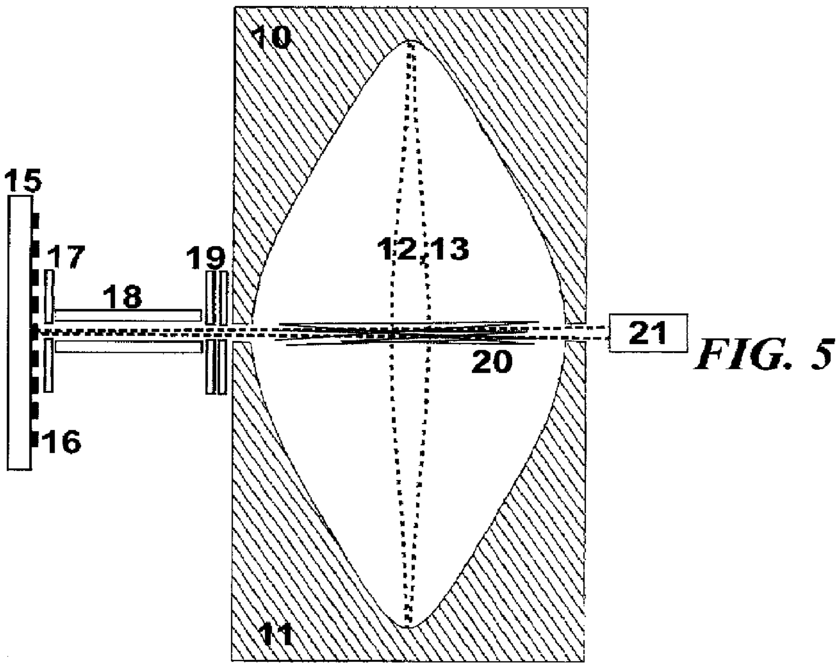
FIG. 5
FIG. 6
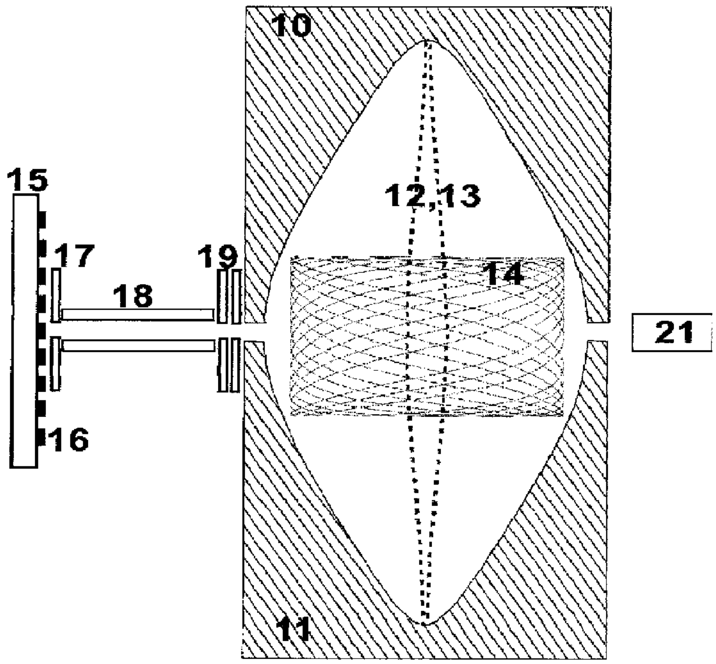

FRAGMENTATION OF IONS IN KINGDON ION TRAPS

BACKGROUND

The invention relates to a method of acquiring fragment ion spectra in Kingdon ion traps which have a potential well for harmonic oscillations of the ions in the longitudinal direction and in which the ions can oscillate radially in a plane between two or more inner electrodes. Kingdon ion traps are electrostatic ion traps in which the ions orbit with a predefined kinetic energy around an inner electrode arrangement or oscillate through an inner electrode arrangement. The inner electrode arrangement is enclosed by an outer housing electrode arrangement kept at a potential which the ions cannot reach. The outer and the inner electrode arrangements can be shaped in such a way that, firstly, the motions of the ions in a longitudinal direction of the Kingdon ion trap are completely decoupled from the motions in a radial direction, and secondly, a potential well is generated in the longitudinal direction, in which the ions can oscillate harmonically, independent of their motion in the radial direction. For longer storage times, a Kingdon ion trap must be operated under ultrahigh vacuum because, otherwise, the ions lose their kinetic energy by collisions with the residual gas and finally impinge on the inner electrode arrangement.

If radially orbiting or radially oscillating ions being confined in the longitudinal direction in a narrow slice are excited to coherent harmonic oscillations in longitudinal direction in the potential well, the ions of different charge-related masses separate because they oscillate at different frequencies. The frequencies are inversely proportional to the square root $\sqrt{(m/z)}$ of the charge-related mass m/z. With suitable detection electrodes, such as an outer electrode arrangement consisting of two symmetric halve-shells split vertically to the longitudinal direction, the image currents of these oscillations can be measured at these half-shells as temporal transient signals. A Fourier analysis delivers the spectrum of the ion oscillations in longitudinal direction from this image current transient, and a mass spectrum can be obtained from the frequency spectrum. As with other Fourier transform mass spectrometers, a very high mass resolution $R=m/\Delta m$ can be achieved, $\Delta m$ being the width of the mass signal of mass m at half height. The precondition is that the inner and outer electrode arrangements are very precisely manufactured, because the harmonicity of the potential well and the independence of radial and longitudinal oscillations depend on their shape.

The expression "Kingdon ion trap mass spectrometer" should refer to a mass spectrometer including an Kingdon ion trap, in which (a) the oscillations in radial and longitudinal direction are decoupled, (b) the longitudinal potential well allows for harmonic oscillations of the ions in longitudinal direction, and (c) there are means for measuring the oscillations in longitudinal direction by their image currents.

The advantage of Kingdon ion trap mass spectrometers compared to ion cyclotron resonance mass spectrometers (ICR-MS) with a similarly high mass resolution R is that no superconducting magnet is required to store the ions and so the technical set-up is less complex and costly. Moreover, the decrease in resolution R in Kingdon ion trap mass spectrometers is only inversely proportional to the square root $\sqrt{(m/z)}$ of the mass of the ions, whereas the decrease in resolution R in ICR-MS is inversely proportional to the mass m/z itself; this means the resolution falls off much more rapidly towards higher masses in ICR-MS.

U.S. Pat. No. 5,886,346 (A. A. Makarov, 1995) elucidates the basics of a Kingdon ion trap mass spectrometer which later was introduced onto the market by Thermo-Fischer Scientific GmbH Bremen under the name Orbitrap™. The Orbitrap™ consists of a single spindle-shaped inner electrode and a coaxial outer electrode, the outer electrode having an ion-repelling electric potential and the inner electrode an ion-attracting electric potential. With the aid of a complicated ion introduction system, the ions are injected as ion packets tangentially to the inner electrode, and move in a hyperlogarithmic electric potential. The kinetic injection energy of the ions is set so that the attractive forces and the centrifugal forces balance each other out, and the ions therefore move on virtually circular trajectories. In the longitudinal direction of the electrode axis, the electric potential of the Orbitrap™ has a potential well, in which the ion packets can execute harmonic oscillations. The harmonically oscillating ion packets induce image currents in the half-shells of the centrally split outer electrode arrangement and these currents are measured as a function of time. The mass resolution of an Orbitrap™ is currently about R=50,000 at m/z=1,000 daltons, and even higher for good instruments. The electrodes must be manufactured to a very high degree of mechanical precision. In addition, the injection of the ions is critical because the kinetic energy of the ions on injection must only vary within a small tolerance range.

The U.S. patent application Ser. No. 12/098,646 (C. Köster, corresponding to DE 10 2007 024 858.1) describes a further type of Kingdon ion trap with several embodiments which feature several inner electrodes in different arrangements. Here too, the inner electrodes and the outer enclosing electrodes can be precisely formed in such a way that the longitudinal motion is completely decoupled from the radial motion and a potential well for generating harmonic oscillation is created in the longitudinal direction. The patent application contains mathematical expressions for equipotential surfaces inside such Kingdon ion traps, and these expressions also describe the exact shapes of the inner and outer electrodes, because they must form equipotential surfaces. The embodiments listed also include those where the analyte ions oscillate in a radial direction in a plane between two or more inner electrodes. The analyte ions oscillating radially in this way can then execute harmonic oscillations in the longitudinal direction. The measurement of these harmonic oscillations produces a highly resolved mass spectrum. The advantage of these embodiments with radial oscillations in one plane is that the requirements with respect to the homogeneity of the kinetic energy of the injected analyte ions are very low because ions with both broad and narrow radial oscillations are stored. If the analyte ions are introduced close to the potential minimum of the longitudinal axis potential, they can be collected locally in this minimum for some time before being excited to execute harmonic oscillations in the longitudinal direction.

Mass spectrometers can only ever determine the ratio of the ion mass to the charge of the ion. In the following, the term "mass of an ion" or "ion mass" always refers to the ratio of the mass m to the number of elementary charges z of the ion, i.e., the mass-to-elementary charge ratio m/z. There are several criteria for determining the quality of a mass spectrometer, the main ones being the mass resolution and the mass accuracy. The mass resolution is defined as $R=m/\Delta m$, where R is the resolution, m the mass of one ion measured in units of the mass scale, and $\Delta m$ the width of the mass signal at half maximum measured in the same units. The term mass accuracy relates to both the statistical spread about a measured mean value and the systematic deviation of the measured mean value from the true value of the mass.

The term "metastable" ions used here relates to those ions which are not stable because they have an excess of internal energy that is larger than the binding energy of individual bonds in the molecule, and which decompose into fragments in a period of between about 10 nanoseconds and about 10 milliseconds (or more). This somewhat strange expression stems from the early days of tandem mass spectrometry, when the fragmentation of the ions in straight flight paths between ion-optical deflecting elements such as magnetic and electric fields was studied, and the ions which decomposed within this time frame were called "metastable". The fragments can be charged and thus represent fragment ions; or they can be neutral.

SUMMARY

In accordance with the principles of the invention metastable ions preferably produced by laser desorption are introduced into the Kingdon ion trap close to the minimum of the longitudinal potential well and stores them there locally. Their excess of internal energy causes most of the metastable ions to decompose ergodically to fragment ions. Only then are all ions excited to execute harmonic oscillations in the longitudinal potential well. The harmonic oscillations are measured as image currents, from which a high-resolution mass spectrum of the fragment ions can be calculated.

An inventive method makes use of a Kingdon ion trap mass spectrometer (as defined above) for acquiring fragment ion spectra and comprises the steps: (1) providing a special Kingdon ion trap, wherein the analyte ions can oscillate radially in a plane between two or more inner electrodes, (2) introducing metastable analyte ions close to the potential minimum of the harmonic longitudinal potential well in the radial oscillation plane, (3) keeping the metastable ions oscillating, locally restricted, in the minimum of the longitudinal potential well for a specified storage time, whereby many of the ions decompose, (4) only then exciting the ions to execute harmonic longitudinal oscillations in the longitudinal potential well, and (5) measuring the image currents of these oscillations. From the image current transient, a frequency spectrum can be generated by Fourier transformation, as is well-known from ICR mass spectrometry, and the frequency spectrum can be converted into a mass spectrum of the fragment ions.

Since the analyte ions execute radial oscillations in the minimum of the longitudinal potential, they spend long periods close to the points of reversal of the radial oscillation and preferably decompose here. As a consequence, about 60 and 70 percent of the fragment ions from the decomposing analyte ions remain in the Kingdon ion trap and can be used for the mass analysis.

Two half-shells of the outer electrode arrangement symmetrically split across the longitudinal direction are preferably used to measure the image currents; both half-shell electrodes are preferably at ground potential and connected to a suitable image current amplifier. With suitable electrical connections, the two half-shells can also perform the task of exciting the analyte ions and the fragment ions to execute harmonic longitudinal oscillations. A variety of methods for these excitations are known from ion cyclotron resonance mass spectrometry. The arrangement of inner electrodes is at an ion-attracting potential, for example between minus 1 and minus 10 kilovolts for positive analyte ions. It is preferable if all the inner electrodes are at the same potential, but arrangements where the inner electrodes are at different potentials can also be used if the shapes of the inner and outer electrodes are suitably adapted to these potentials.

The aperture for introducing the analyte ions can be located in one of the two half-shells of the outer electrode arrangement, very close to the central dividing slit. The entrance aperture can, however, also be located in the dividing slit itself.

A Kingdon ion trap mass spectrometer of this type is particularly suited to analyze fragments of analyte ions generated by laser desorption from solid samples on sample supports. The sample support can be located almost directly in front of the injection aperture of the Kingdon ion trap with only a minimum of beam guiding optics between sample and aperture; but it can also be separated from the Kingdon ion trap by a quadrupole mass filter. The laser beam for the desorption can be directed through the Kingdon ion trap itself because there is no inner electrode in the center of this type of Kingdon ion trap. The laser beam is introduced through a second aperture located in the outer electrodes, preferably opposite the injection aperture.

The analyte ions generated by one or more laser beam pulses fly through the injection aperture into the Kingdon ion trap, where they are captured. The voltage difference between outer and inner electrodes usually is increased during the injection pulses in order to trap the ions. As is known from MALDI time-of-flight mass spectrometers, most of the analyte ions desorbed and ionized by pulses of laser light have an excess of internal energy, i.e., they are metastable, a fact which, according to the invention, can be exploited for the acquisition of fragment ion spectra.

Metastable analyte ions produced in any other way can also be introduced into the Kingdon ion trap, of course, and be decomposed to fragment ions according to the invention during the local storage, and ultimately be measured.

For laser desorption, in particular for matrix-assisted laser desorption with suitable matrix materials, it is known that increasing the current intensity of the desorbing laser beam produces a further type of fragmentation of protein ions in the direct laser plasma, which is called "in-source decomposition" (ISD). These fragment ions exhibit a very different fragmentation scheme; these fragment ion spectra resemble the spectra obtained from electron-induced fragmentations such as ECD (electron capture dissociation) or ETD (electron transfer dissociation). Since these fragment ions can also be easily introduced into the Kingdon ion trap, fragment ion spectra from both types of fragmentation process, ergodic and non-ergodic (electron-induced), can be obtained from the same sample.

BRIEF DESCRIPTION OF THE DRAWINGS

FIG. 5 shows the Kingdon ion trap with a laser (21) whose pulsed beam desorbs and ionizes material from samples (16) on the sample support (15). The ions thus produced are injected as ion packets through a diaphragm (17), a quadrupole filter (18) and a short ion lens (19) into the interior of the Kingdon ion trap, where they oscillate locally in the potential minimum as a string-shaped bunch (20) of ions. If the injected ions are metastable, some of them decompose to fragment ions. The quadrupole filter makes it possible to suppress light ions, from the matrix, for example, or to select parent ions for the fragmentation.

FIG. 6 shows the Kingdon ion trap from FIG. 5 after the unfragmented analyte ions and the newly formed fragment ions (14) have been excited to execute harmonic oscillations in the longitudinal, i.e. in the z direction. Their image currents can now be measured in the two half-shells (10) and (11) of the outer electrode. These measurements can be used to acquire, by Fourier-transformation, a frequency spectrum, from which a high-resolution mass spectrum can be calculated in the familiar way.

DETAILED DESCRIPTION

Figure 7:
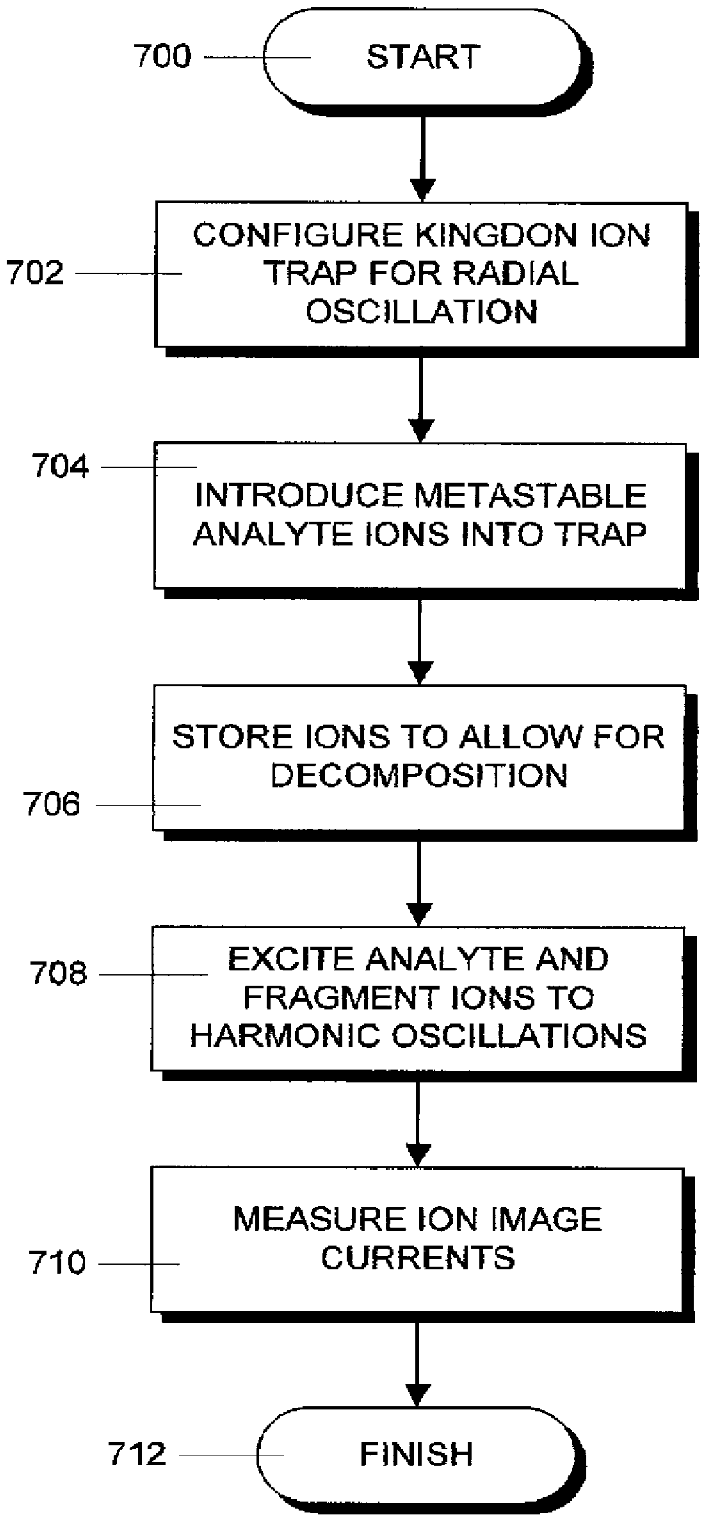
FIG. 7 is a flowchart showing the steps in an illustrative method for generating a mass spectrum in accordance with the principles of the invention.

The method for acquiring fragment ion spectra according to the invention is shown in FIG. 7 and starts in step 700. Step 702 involves configuring a Kingdon ion trap mass spectrometer with a specially shaped Kingdon ion trap, in which the analyte ions can oscillate radially between two or more inner electrodes, and in which there is a potential well in the longitudinal direction in which ions can oscillate harmonically, completely decoupled from their radial motion. U.S. patent application Ser. No. 12/098,646 filed by C. Köster on Apr. 7, 2008 elucidates several embodiments of this type of Kingdon ion trap with precise information on the shapes of the inner and outer electrodes. This patent application is hereby incorporated herein by reference in its entirety.

FIGS. 1 to 4 illustrate an arbitrarily selected type of such a Kingdon ion trap with two inner electrodes in both a three-dimensional representation (FIG. 1) as well as in the three cross-sections (FIGS. 2 to 4) with a cloud (14) of ions oscillating both radially and axially in one plane.

The invention further comprises, in step 704, the introduction of metastable analyte ions into such a Kingdon ion trap, close to the potential minimum of the harmonic longitudinal potential well into the radial oscillation plane, and, in step 706, allowing the ions to oscillate, locally restricted, in the minimum of the longitudinal potential during a predetermined storage time. A large number of the metastable ions decompose during this storage time. After this storage period for the decomposition of the analyte ions—ideally after almost all metastable analyte ions have decomposed—in step 708, the generated fragment ions, together with the remaining unfragmented analyte ions, are excited by means of known methods to execute harmonic longitudinal oscillations in the longitudinal potential. In step 710, the image currents of the oscillating ions are measured in suitable detection electrodes, for example in the two half-shells (10, 11) of the outer electrode arrangement, and from these image currents, the mass spectrum of the fragment ions is derived with high mass resolution R, again using known methods. The method finishes in step 712.

In contrast with the Orbitrap™, the ions should be introduced into this type of Kingdon ion trap with almost zero kinetic energy, because no centrifugal forces are required for a rotational motion around a central inner electrode to radially store the ions, substantially simplifying the introduction of the ions. An increase of the voltage between inner and outer electrodes during the introduction process helps to capture the ions. The Kingdon ion trap then can accept a relatively large energy spread.

Due to the radial oscillation in the minimum of the longitudinal potential well, the analyte ions spend longer times close to the points of reversal of the radial oscillation and preferably decompose here. This means that most of the fragment ions resulting from the decomposing analyte ions continue to oscillate in the Kingdon ion trap and can be used for the mass analysis, even if the charge state of multiply charged ions is reduced by the decomposition, albeit some of them execute narrower radial oscillations. In case of metastable ions generated by matrix-assisted laser desorption, the ions are singly charged only, and almost all fragment ions of decomposing analyte ions stay within the Kingdon ion trap.

The method preferably uses an outer electrode arrangement centrally split into two half-shells (10, 11) at ground potential as detection electrodes for measuring the image currents. But it is also possible for the outer electrode arrangement to be at a high ion-repelling ambient potential, while the inner electrodes (12, 13) are at almost ground potential and, centrally split, are connected to the image current amplifier for measuring the ion oscillations in the longitudinal direction z.

With appropriate electrical connections, the halve electrodes of the outer or inner electrode arrangements can also be used to excite the mixture of analyte and fragment ions to execute coherent harmonic longitudinal oscillations after the fragmentation period has ended. A wide variety of methods for this excitation are known from ion cyclotron resonance mass spectrometry. One way is to use so-called "chirp" or "synch" pulses which contain all the excitation frequencies either in ascending or descending order (for the "chirp") or synchronously (in case of the "synch"). It is also possible to use DC pulses, preferably with moderately increasing voltage at the start flank, in order to give ions of all masses about the same oscillation amplitude. The specialist in the field of mass spectrometry knows these excitation methods from ICR mass spectrometers.

In this case of exciting the ions by the half-shells, the connections of the half-shells must be switched at least between two different operation periods, an image current measurement period and an excitation period of the ions to execute longitudinal oscillations. It has proven to be advantageous to introduce a third switching period which consists in keeping both half-shells firmly at ground potential. In this preferred embodiment of the method according to the invention, the Kingdon ion trap is filled with ions during this switching period with firm ground potential applied to the half-shells. If ions impinge on the half-shells from the outside or the inside, no charging of the half-shells results which could interfere with the subsequent measurement of the image currents. It is also expedient to apply this firm ground potential to the half-shells again for a brief period after the ions have been excited to execute longitudinal oscillations, in order to discharge any charge on the half-shells which could have resulted from the excitation of the ions.

Figure 8:
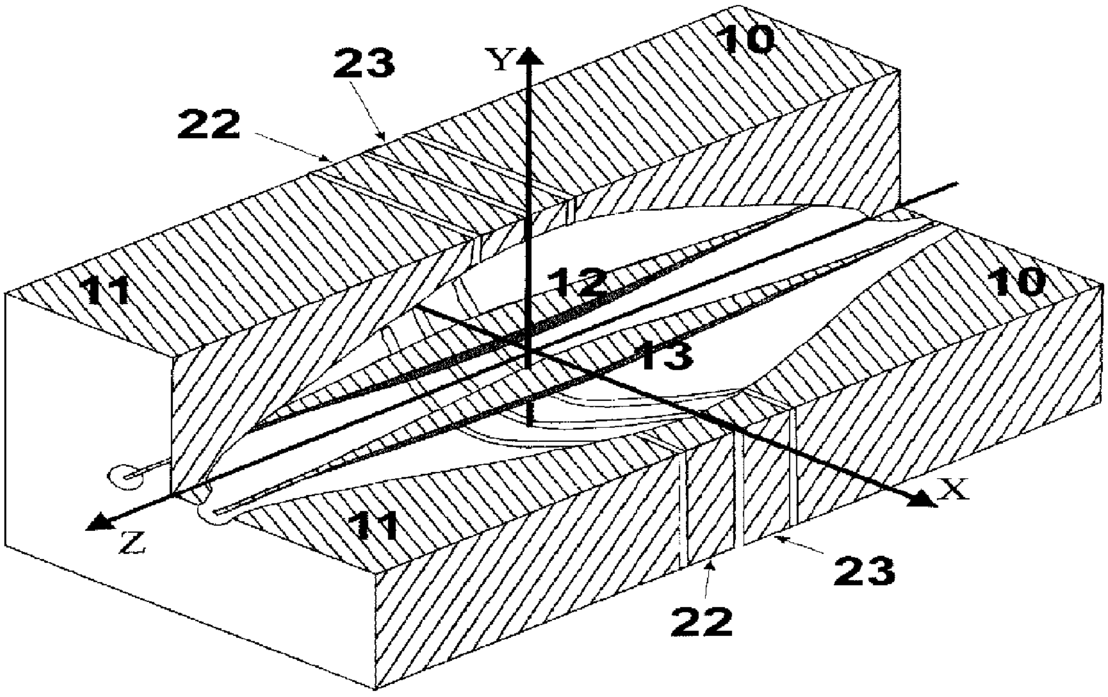
FIG. 8 shows the electrostatic Kingdon ion trap of FIG. 1 including auxiliary excitation electrodes (22) and (23).

Instead of simply applying a central slit in the electrode arrangement, the two half-shells can also be separated from each other by a pair of additional excitation electrodes (21) and (23) in the form of narrow rings as shown in FIG. 8. For the dimensions described below for the Kingdon ion trap mass spectrometer, the rings can be between about one and ten millimeters wide; a width of between two and four millimeters is preferred. This means the outer half-shells can always remain firmly connected to the amplifiers for the image currents, which is advantageous for obtaining a very low ohmic line resistance. The excitation to execute longitudinal oscillations and also the discharging of impinging ions by application of the ground potential is then performed by the additional excitation electrodes.

If the mixture of fragment ions contains ions which could diminish the quality of the fragment ion spectrum, e.g. by reducing the dynamic measurement range, as for example by too many unfragmented analyte ions or by too many ions from the matrix material, the disturbing ions can be excited so strongly by resonant excitation via the half-shells (or the additional excitation electrodes) that they leave the Kingdon ion trap by impinging on the electrodes.

In a preferred embodiment, the outer electrodes are essentially at ground potential and the inner electrodes (here 12, 13) at an ion-attracting potential, for example minus one to minus ten kilovolts for positive analyte ions; between about four and six kilovolts is especially advantageous. As already mentioned, it is not essential that the inner electrodes have all the same potential if the shape of the electrodes is correspondingly adapted. For preferred embodiments, all inner electrodes are at the same potential, however.

It is also possible to use inner electrodes split into halves in longitudinal direction, and to measure the image currents at these halves of the inner electrodes. Here also special excitation electrodes can be implemented between the halves of the inner electrodes. Or the excitation can be performed by using the outer half-shell electrodes, while the measurements are performed with the inner electrodes (or vice versa).

A higher voltage difference between inner and outer electrodes results in an improved mass resolution, but also makes it more problematic to provide stable electronics. The voltages must be kept extremely stable; a mass precision of one millionth of the mass (1 ppm) requires a voltage that is at least equally stable, at least for the time duration of the spectrum acquisition, but preferably for longer times of several spectrum acquisitions including a mass calibration period of the mass spectrometer.

The aperture for introducing the analyte ions can be located in one of the two half-shells (10, 11) of the outer electrode or in one of the additionally introduced excitation electrodes very close to the center split. The aperture is preferably screened by an ion-optical diaphragm (19) in such a way that no ions can impinge on the half-shells of the outer electrodes, thus preventing interferences with the image current measurement by charging up the half-shells. The entrance aperture can also advantageously be located directly in the dividing central slit, again with ion-optical screening.

If the analyte ions are not introduced through an aperture in the central slit between the two half-shells (10, 11) of the outer electrodes, but slightly to the side of it, the introduced analyte ions also immediately start to oscillate in a small longitudinal section in the longitudinal direction. If the aperture is about five millimeters away from the central slit, for example, the analyte ions oscillate about the central slit with a total oscillation amplitude of about ten millimeters peak-to-peak. This is not detrimental. After the fragmentation period for the metastable analyte ions has finished, the whole ion packet, which is ten millimeters wide, can now be excited to execute oscillations in the longitudinal direction. A packet of this width is still just coherent enough for the image current measurement.

A type of analyte ion particularly suited to this invention is produced by laser desorption, preferably matrix-assisted laser desorption (MALDI), from solid samples on a sample support. As is known from MALDI time-of-flight mass spectrometers, with slightly higher beam pulse energy than normally applied, most of the desorbed analyte ions have an excess of internal energy, i.e., they are metastable, a fact which, according to the invention, can be exploited for the acquisition of fragment ion spectra. The sample support can be located almost directly in front of the injection aperture with only a minimum of beam guiding optics between sample and aperture. In a preferred embodiment, however, a quadrupole ion mass filter (18) is located between Kingdon ion trap and sample support (15); any interfering ions can then be filtered out of the mixture of ions generated by the laser beam pulse. These filtered-out ions particularly can include the light ions that are formed in large numbers with matrix-assisted laser desorption from almost completely destroyed matrix molecules. It is particularly possible to select, by filtering out all other ions, the analyte ions whose fragment ion spectrum is to be measured from the mixture of analyte ions and to introduce them into the Kingdon ion trap. The analyte ions whose fragment ion spectrum is to be measured are often called "parent ions"; the corresponding fragment ions are then called "daughter ions".

Before the parent ions can be selected for fragmentation, usually a mass spectrum of all the analyte ions from the sample will be measured to get an overview of the injected analyte ions. For this overview, the analyte ions must be excited to execute longitudinal oscillations as soon as they have been injected in order to prevent the formation of fragment ions before longitudinal excitement. If the analyte ions have to be collected from several laser shots over a period of time, this is no longer possible. In such cases it is expedient to apply the corresponding samples onto the sample support twice and to add some sugar, either a monosaccharide or a disaccharide, to one of the two samples in each case. This sugar mixes with the plasma that forms with the laser bombardment, and reduces the internal energy of the analyte ions so that far fewer metastable analyte ions are formed. It is thus better to use these sugared samples to obtain overview spectra. Also the application of short laser light pulses of only one nanosecond duration or less diminishes the amount of metastable ions formed, whereas laser light pulses of several nanoseconds increase the number of metastable ions.

As is shown in FIG. 5, the laser beam for the desorption can be directed from the laser (21) through the Kingdon ion trap itself because there is no inner electrode in the center of this type of Kingdon ion trap. The laser beam is introduced through a second aperture located in the outer electrode, opposite the injection aperture. The analyte ions generated by one or more laser beam pulses from one of the samples (16) on the sample support (15) fly through the aperture (17), quadrupole filter (18), lens system (19) and injection aperture into the Kingdon ion trap which captures them directly. The voltage difference between outer and inner electrodes should be increased during each injection in order to further improve the trapping conditions.

The pulsed laser beam can, however, also bombard the sample laterally at an angle, as is normal practice in MALDI time-of-flight mass spectrometers with axial injection into the trajectory, for example. In this case, the injection may pass through the openings between the rods of the quadrupole filter (18), guided by mirrors.

The diaphragm (17) can particularly be used to extract the ions from the plasma formed by the laser bombardment with a short delay of between about 10 and 1,000 nanoseconds rather than immediately. This delay increases the yield of analyte ions, particularly metastable analyte ions. The ions can then be accelerated by the diaphragm (17) to a kinetic energy that is advantageous for passing through the quadrupole filter. It is thus possible to select an optimum time for the ions to remain in the quadrupole filter and thus be subjected to the effect of its selective field. The final injection energy is then set by the voltages at the ion-optical lens (19) with respect to the potential of the outer electrodes (10, 11).

It is one of the big advantages of such a MALDI ion source for this Kingdon ion trap mass spectrometer that the complete mass spectrometer including ion source, mass filter, and Kingdon ion trap, can be kept at ultrahigh vacuum. Other types of metastable ion generation or guiding the ions towards the Kingdon ion trap may require the application of sample gas or damping gas; these types of ion generation are not that favorable. However, metastable analyte ions produced in any other way can, of course, also be introduced into the Kingdon ion trap according to the invention before decomposing to fragment ions, and ultimately be used to measure a fragment ion spectrum. Differential pumping systems then help to maintain the ultrahigh vacuum in the Kingdon ion trap to be maintained.

For mass measurements, the ions have to be excited in a coherent form to execute harmonic oscillations in the longitudinal direction, and the mass-dependent frequency of their harmonic oscillations in the z direction has to be measured. Ions of the same mass must essentially oscillate as a coherent ion packet in the z direction or at least have a limited spatial expansion along the z direction during the measuring time. The great advantage of a harmonic potential consists in the fact that ions of the same mass but different initial velocities have the same oscillation period, so after one oscillation cycle, an ion packet is spatially and temporally focused again, i.e., the ions move coherently at least part of the time. It is a basic condition for the measurement of the frequency of the harmonic oscillation that the ions also move radially on spatially stable trajectories for a sufficient time and do not collide with one of the electrodes of the electrode system. This requires a sufficiently good ultrahigh vacuum so that the ions do not lose any of their kinetic energy in collisions with the residual gas, even for oscillation periods of up to ten seconds. It is not easy to produce the ultrahigh vacuum required in the Kingdon ion trap because of its closed design; it is therefore advantageous if the outer electrodes offer good pumping access by having several apertures at the axial ends, where the electric field can tolerate slight perturbations.

The oscillation period of the harmonic oscillation is proportional to the square root of the ion mass. The mass resolution is proportional to the number of oscillation periods measured. To increase the mass resolution, the ion packets must simply be measured for longer times in the electrostatic ion trap. With typical oscillation frequencies of a few hundred kilohertz one can easily obtain a high mass resolution of $R>50,000$ for ions with a mass of about 200 daltons in a measuring time of about one second. It is perfectly possible to achieve mass resolutions far in excess of $R=100,000$ with longer measuring times.

The oscillating ion packets induce a periodic signal in an ion detector, and this signal has to be electronically amplified and measured. The ion detector can contain different types of detection elements, such as detection coils, in which the ion packets induce voltages as they fly through, or detection electrodes, for example segments of the outer electrode or inner electrodes, in which the ion packets induce image currents as they fly past.

A mass spectrometer for the method according to the invention contains the electrostatic Kingdon ion trap and also an ion source and, optionally, an ion guide according to the prior art; the ion guide transfers the ions from the ion source to the electrostatic Kingdon ion trap, stores them if necessary, conditions them temporally or spatially, and selects them according to their mass or fragments them.

The separation between the two inner electrodes (12, 13) is preferably less than 50 millimeters, and especially about 10 millimeters. The maximum internal diameter of the outer electrodes (10, 11) is preferably less than 200 millimeters; a value of about 50 millimeters is advantageous. An advantageous length for the outer electrodes is less than 200 millimeters, preferably about 100 millimeters. A mass spectrometer for this invention can therefore have a very compact configuration.

Figure 1:
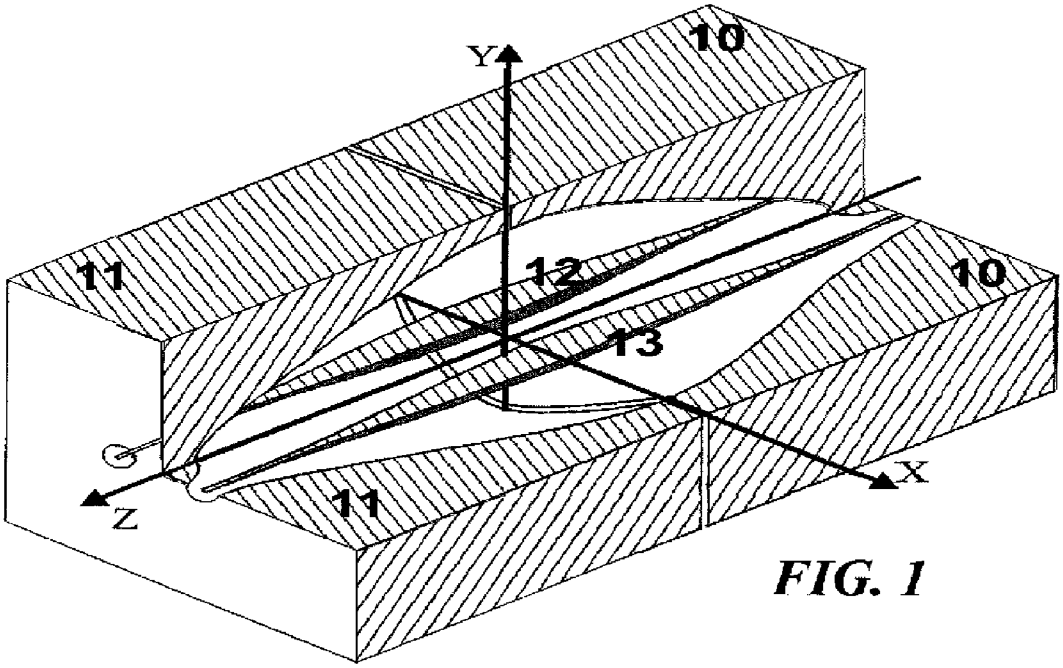
FIG. 1 shows an electrostatic Kingdon ion trap with an outer electrode arrangement split in the center into two half-shells (10) and (11) and two spindle-shaped inner electrodes (12, 13) in a three-dimensional representation with the coordinates x, y and z being displayed.
Figure 2:
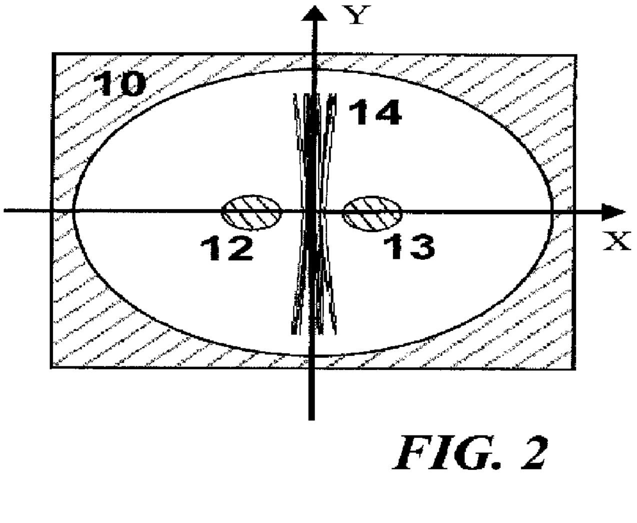
FIGS. 2 to 4 show the Kingdon ion trap in the x-y plane, x-z plane and y-z plane respectively; the trajectories (14) of stored ions oscillating in the radial direction and the longitudinal z direction are also shown as a projection onto the respective plane.
Figure 3:
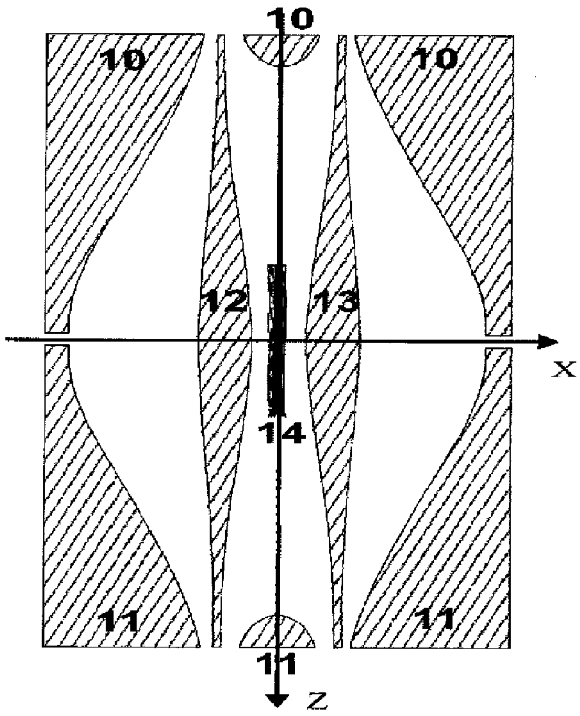
Figure 4:
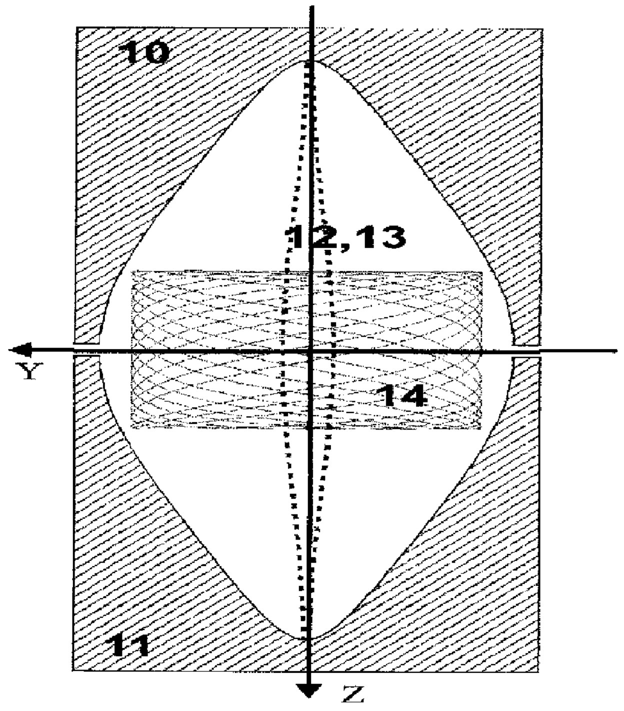

FIGS. 2 to 4 show the electrode system (1) of the favorable Kingdon trap of FIG. 1 in the x-y plane, x-z plane and y-z plane respectively. In addition to the outer electrode half-shells (10, 11) and the inner electrodes (12, 13), the trajectories (14) of stored ions are also shown projected onto the respective plane.

The separation of the inner electrodes (12, 13) in the x-y plane is approx. 10 millimeters for an electrode length of around 90 millimeters. As can be seen in FIGS. 3 and 4, the outer electrode arrangement is formed as two half-shells (10, 11).

FIGS. 5 and 6 show a Kingdon ion trap with a desorption ion source, preferably a MALDI ion source, in order to inject metastable ions in pulses. The MALDI ion source here consists of a sample support (15), onto which samples (16) are applied, the diaphragm (17), the quadrupole filter (18) and the electrodes (19). The outer electrode arrangement consists of the two half-shells (10, 11).

The sample support (15) can be moved via a movement device (not shown) in such a way that further samples (16) on the sample support (15) can be moved in succession into the firmly located focus of the pulsed laser beam from the laser (21). Different locations on one sample (16) can also be scanned in this way.

The samples (16) contain analyte molecules embedded in a solid polycrystalline matrix. The pulsed laser beam from the pulsed UV laser (21) is focused onto one of the samples (16) through two apertures in the outer electrode arrangement (10, 11). The pulsed irradiation causes the matrix to explosively convert from the solid state into a vaporization plasma cloud, in which the ionization of the analyte molecules takes place. It is advantageous if the ions are not extracted from the plasma immediately, but first left in the plasma for a short time. This increases the yield of analyte ions, particularly metastable analyte ions. After about 10 to 1,000 nanoseconds, the ions can be extracted by a voltage at the diaphragm (17) and accelerated to an advantageous level.

A favorable method according to the invention involves selecting and isolating the parent ions by the quadrupole rod mass filter system (18) and introducing only them through the lens system (19) into the Kingdon ion trap.

Since the ions are pulsed in at right angles to the inner wall of the outer electrode (10, 11), the kinetic energy of the ions on entry should be very low so that the ions do not impinge on the outer electrodes when returning from the first radial oscillation. It is particularly advantageous to continuously increase the voltage difference between outer and inner electrodes as the ions are pulsed in, from about 1,000 volts to 5,000 volts, for example. For several laser beam pulses, the voltage may be increased stepwise during the introduction of each of the ion bunches.

The method according to the invention has its particular appeal and a special advantage in that it permits the manufacture of a high-performance tabletop instrument for very highly resolved and mass-accurate MALDI mass spectrometry (MALDI=matrix-assisted laser desorption and ionization). It is possible to obtain not only highly mass-accurate mass spectra of protein mixtures, for example mixtures of digest peptides, but also high-resolution fragment ion spectra of both the ergodic and non-ergodic types for the individual components in the mixture.

Mixture analysis of peptides requires the formation of mainly stable analyte ions; ergodic fragment ion spectra need metastable ions; non-ergodic fragment ion spectra require spontaneous decay product ions from in-source decay (ISD).

The generation of stable ions can be supported by suitable matrix materials, by the addition of sugars, and by short UV laser beam light pulses of one nanosecond duration in maximum of low energy. The production of metastable ions is enhanced by longer UV laser beam light pulses of several nanoseconds duration and much higher energy. The initiation of prompt ion decay is supported by special matrix materials (e.g. DAN=diamino-naphtalene), and by short laser beam light pulses of sufficient energy.

For laser desorption, in particular matrix-assisted laser desorption, it is known that increasing the pulse energy of the desorbing laser and applying favorable matrix substances produces a prompt fragmentation of protein ions, taking place immediately in the laser plasma and called "in-source decomposition" (ISD). These fragment ions exhibit a very different fragmentation scheme; the fragment ion spectra resemble the spectra obtained from electron-induced fragmentations such as ECD (electron capture dissociation) or ETD (electron transfer dissociation). Since these fragment ions can also be easily introduced into the Kingdon ion trap, fragment ion spectra from both types of fragmentation process, ergodic and electron-induced (non-ergodic), can be obtained from the same sample with an arrangement as shown in FIGS. 5 and 6. The two types of fragment ion spectra in parallel make it possible to determine the bare sequence of the amino acids, on the one hand, and the type and localization of posttranslational modifications, on the other hand. Until now, such analyses have only been possible using complex TOF-TOF instruments, and even then with only limited mass accuracy.

In MALDI mass spectrometry, the samples are applied in liquid form to sample supports as solutions of matrix materials with low amounts of analyte molecules and then dried. Generally, the samples are substance mixtures that have undergone varying degrees of separation in separation processes such as 2D gel electrophoresis or HPLC (liquid chromatography). Hyphenated techniques using online separation methods always involve temporal constraints for the analytical method used. With MALDI, this temporal coupling is removed so that the analysis of one sample can take as long as may be required. This is advantageous particularly for high-resolution methods using Fourier transform mass spectrometers, because they always use longer analysis times of between a quarter of a second and about 10 seconds, and each sample is often subjected to a number of different analyses for the different components or different types of fragmentation.

It is very simple for persons skilled in the art to derive further interesting applications for the method according to the invention for the internal fragmentation of metastable ions in special types of Kingdon ion trap. These shall also be covered by the protection of this patent application.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A method for acquiring fragment ion spectra in a Kingdon ion trap mass spectrometer with a longitudinal potential well having a potential minimum inside the Kingdon ion trap in which ions can harmonically oscillate, comprising:

(a) configuring the Kingdon ion trap so that ions can oscillate radially in a plane between two or more inner electrodes;

(b) introducing metastable analyte ions into the Kingdon ion trap close to the potential minimum of the longitudinal potential well;

(c) storing the metastable analyte ions in the minimum of the longitudinal potential well for a predetermined storage period so that the metastable ions oscillate and decompose to produce fragment ions;

(d) exciting the analyte and fragment ions to execute harmonic oscillations in a longitudinal direction in the longitudinal potential well; and (e) measuring image currents of the ions oscillating in the longitudinal direction.

2. The method of claim 1, wherein, in step (b), the metastable analyte ions are produced by laser desorption.

3. The method of claim 2, wherein, in step (b), the metastable analyte ions are produced by matrix-assisted laser desorption.

4. The method of claim 1, wherein step (b) comprises selecting and isolating the metastable analyte ions as parent ions from a mixture of analyte ions.

5. The method of claim 4, wherein the parent ions are selected and isolated by a quadrupole mass filter.

6. The method of claim 1, wherein the Kingdon ion trap has outer and inner electrodes and wherein step (b) comprises increasing a voltage difference between the outer and the inner electrodes as the analyte ions are introduced.

7. The method of claim 1, wherein the Kingdon ion trap has outer and inner electrodes, one of which forms symmetrical half electrodes in a longitudinal direction, and step (e) comprises using one pair of half electrodes to measure the image currents.

8. The method of claim 7, wherein step (b) comprises introducing the analyte ions through an aperture located in a gap between the half electrodes.

9. The method of claim 7, wherein step (d) comprises exciting the analyte ions to execute harmonic longitudinal oscillations in the longitudinal potential with a pair of half electrodes acting as excitation electrodes.

10. The method of claim 9, wherein step (d) comprises exciting the analyte ions in a longitudinal direction by applying one of chirp pulses, synch pulses and DC pulses to the pair of half electrodes.

11. The method of claim 1, wherein the Kingdon ion trap has outer and inner electrodes forming symmetrical half electrodes and a pair of additional excitation electrodes is located between the half electrodes, and wherein step (d) comprises exciting the ions to execute harmonic oscillations in the longitudinal direction with the additional excitation electrodes and wherein step (e) comprises using the half electrodes as detection electrodes for measuring the image currents.

12. The method of claim 11, wherein step (d) comprises applying one of chirp pulses, synch pulses and DC pulses to the additional excitation electrodes to excite the ions in a longitudinal direction.

13. The method of claim 11, wherein step (b) comprises introducing the analyte ions through an aperture located in a gap between the pair of additional excitation electrodes.

14. The method of claim 1, wherein step (d) comprises ejecting ions which limit the dynamic measurement range of the fragment ion spectrum from the Kingdon ion trap by resonant excitation.

* * * * *